United States Patent
Demanze

(10) Patent No.: US 11,820,101 B2
(45) Date of Patent: Nov. 21, 2023

(54) UNDERWATER PIPE COMPRISING A SHEATH MADE OF A POLYPROPYLENE HOMOPOLYMER

(71) Applicant: TECHNIP FRANCE, Courbevoie (FR)

(72) Inventor: Frédéric Demanze, Caudebec en Caux (FR)

(73) Assignee: TECHNIP FRANCE

( * ) Notice: Subject to any disclaimer, the term of this patent is extended or adjusted under 35 U.S.C. 154(b) by 264 days.

(21) Appl. No.: 16/090,712

(22) PCT Filed: Apr. 5, 2017

(86) PCT No.: PCT/EP2017/058118
§ 371 (c)(1),
(2) Date: Oct. 2, 2018

(87) PCT Pub. No.: WO2017/174660
PCT Pub. Date: Oct. 12, 2017

(65) Prior Publication Data
US 2020/0324507 A1 Oct. 15, 2020

(30) Foreign Application Priority Data
Apr. 6, 2016 (FR) ...................... 16 53018

(51) Int. Cl.
*B32B 1/08* (2006.01)
*B32B 15/02* (2006.01)
(Continued)

(52) U.S. Cl.
CPC ............... *B32B 1/08* (2013.01); *B32B 15/02* (2013.01); *B32B 15/085* (2013.01); *B32B 27/22* (2013.01);
(Continued)

(58) Field of Classification Search
CPC ......... B32B 1/08; B32B 15/02; B32B 15/085; B32B 27/22; B32B 27/32; B32B 27/327;
(Continued)

(56) References Cited

U.S. PATENT DOCUMENTS

| 4,606,953 A | 8/1986 | Suzuki et al. ............... 428/36 |
| 4,649,963 A * | 3/1987 | Raghavan ............ B29C 53/665 138/130 |

(Continued)

FOREIGN PATENT DOCUMENTS

| CN | 1529731 A | 9/2004 |
| CN | 104640705 A | 5/2015 |

(Continued)

OTHER PUBLICATIONS

Polypropylene BE60-7032 Product Data Sheet (Year: 2016).*
(Continued)

*Primary Examiner* — James C Yager
(74) *Attorney, Agent, or Firm* — OSTROLENK FABER LLP

(57) ABSTRACT

An underwater pipe, including a metal reinforcing layer around an inner polymeric sealing sheath capable of being in contact with hydrocarbons. The inner polymeric sealing sheath includes a homopolymeric polypropylene or a mixture of homopolymeric polypropylenes, wherein the homopolymeric polypropylene or the mixture has a density greater than 0.900 g/cm$^3$, and a melt index measured at 230° C. under a mass of 2.16 kg of less than 10 g/10 minutes, its preparation method and its use for the transport of hydrocarbons. Such a sheath may be used in contact with hydrocarbons at high temperature.

19 Claims, 1 Drawing Sheet

(51) Int. Cl.
*B32B 15/085* (2006.01)
*B32B 27/22* (2006.01)
*B32B 27/32* (2006.01)
*F16L 11/08* (2006.01)
*F16L 57/06* (2006.01)

(52) U.S. Cl.
CPC ............ *B32B 27/32* (2013.01); *F16L 11/083* (2013.01); *B32B 2270/00* (2013.01); *B32B 2307/704* (2013.01); *B32B 2307/714* (2013.01); *B32B 2307/72* (2013.01); *B32B 2307/7265* (2013.01); *B32B 2597/00* (2013.01); *F16L 57/06* (2013.01)

(58) Field of Classification Search
CPC .......... B32B 2270/00; B32B 2307/704; B32B 2307/714; B32B 2307/72; B32B 2307/7265; B32B 2597/00; B32B 2307/30; B32B 2307/734; B32B 27/20; F16L 11/083; F16L 57/06; F16L 57/00
USPC ........................................................ 428/34.1
See application file for complete search history.

(56) References Cited

U.S. PATENT DOCUMENTS

| | | | | |
|---|---|---|---|---|
| 2010/0218839 | A1* | 9/2010 | Conley | ................... B32B 27/32 138/137 |
| 2013/0247996 | A1* | 9/2013 | Tronc | ....................... B32B 1/08 138/137 |
| 2015/0030295 | A1* | 1/2015 | Do | ....................... G02B 6/4432 356/73.1 |
| 2016/0123504 | A1* | 5/2016 | Pasquier | ................... B32B 1/08 252/389.52 |

FOREIGN PATENT DOCUMENTS

| | | |
|---|---|---|
| FR | 3 020 440 A1 | 10/2015 |
| JP | 2003-245974 A | 9/2003 |
| JP | 2006-335780 A | 12/2006 |
| WO | WO 2006/120320 A1 | 11/2006 |
| WO | WO 2013/128097 A1 | 9/2013 |
| WO | WO2014020052 * | 2/2014 |

OTHER PUBLICATIONS

International Search Report dated Jul. 13, 2017 in corresponding PCT International Application No. PCT/EP2017/058118.
Written Opinion dated Jul. 13, 2017 in corresponding PCT International Application No. PCT/EP2017/058118.
Preliminary Search Report dated Nov. 30, 2016 in corresponding French Patent Application No. 1653018.

* cited by examiner

UNDERWATER PIPE COMPRISING A SHEATH MADE OF A POLYPROPYLENE HOMOPOLYMER

CROSS-REFERENCE TO RELATED APPLICATIONS

The present application is a 35 U.S.C. §§ 371 national phase conversion of PCT/EP2017/058118, filed Apr. 5, 2017, which claims priority to French Patent Application No. 16 53018, filed Apr. 6, 2016, the contents of which are incorporated herein by reference. The PCT International Application was published in the French language.

TECHNICAL FIELD

The present invention relates to an underwater pipe for the transport of hydrocarbons in deep water.

BACKGROUND OF THE INVENTION

These pipes are likely to be used under high pressures, above 100 bar, or even up to 1000 bar, and at high temperatures, above 130° C., or even 170° C., for long periods of time, i.e. several years, typically 20 years.

Underwater pipes for the transport of hydrocarbons in deep water comprise a metal reinforcing layer around an inner polymeric sealing sheath in which hydrocarbons flow.

The constituent material of the inner polymeric sealing sheath must be chemically stable and able to mechanically resist the fluid transported and its properties (composition, temperature and pressure). The material must combine properties of ductility, resistance to weather (generally a pipe life of at least 20 years), and mechanical resistance to heat and pressure. The material must, in particular, be chemically inert with respect to the chemical compounds constituting the transported fluid. Typically, the hydrocarbons transported comprise crude oil, water, and pressurized gases, such as hydrogen sulphide ($H_2S$) in a concentration generally of the order of 100 ppm, carbon dioxide ($CO_2$) generally at a pressure between 1 bar and 100 bar, and methane ($CH_4$) generally at a pressure between 1 bar and several hundred bar. The organic acids may, for example be benzoic acid, methanoic acid and/or acetic acid. These increase the acidity of crude oil (between 0.1 and 8 TAN, for example). This acidity may lead to the premature degradation of certain polymers, such as polyamides.

An underwater pipe may be flexible or rigid. The inner polymeric sealing sheath of a rigid underwater pipe is generally based on polyethylene.

Various polymeric materials are used in a inner polymeric sealing sheath for an underwater flexible pipe, for example:
  polyethylene, especially high density polyethylene, for low temperature applications (typically below 80° C.),
  polyamide (PA), in particular polyamide 11. In contrast to polyethylene, polyamide has good blistering resistance when it is pressurized and at temperature, as well as a low swelling tendency when in contact with the petroleum fluid. The polyamide is generally used under conditions of hydrocarbon transport for which the pressure is high and where the temperature preferably remains below 90° C., or even for a temperature which may rise up to 110° C.
On the other hand, one of the drawbacks of polyamide is that it tends to hydrolyze in the presence of water (often contained in production crudes) (chemical aging). Hydrolysis is rapid when subjected to temperatures (of the order of 110° C. and above) and low pH values (pH below 7). Another drawback is its purchase cost which is significantly greater than that of polyethylene.

polyvinylidene fluoride (PVDF) has a very good chemical inertness. PVDF sheaths can withstand high operating pressures and temperatures up to 130° C.–150° C.

Its major drawback is its price that is much higher than that of polyethylene or polyamide. In addition, some PVDF are sensitive to cavitation, which limits its use as the sheath of a flexible pipe. Under the effect of the internal pressure in the flexible pipe, the polymeric sheath, which is relatively flexible, is pressed against the inner face of the pressure vault. The part of the polymeric sheath which is not locally supported by the reinforcing layer (i.e. the part opposite the gap) deforms under the effect of pressure. This phenomenon of deformation of the polymeric sheath in the gaps of the reinforcing layer is called creep or extrusion of the polymeric sheath. Under these conditions, these deformations may be at the origin of the appearance of cavitations on the polymeric sheath. Cavitation is the appearance and/or growth of micro vacuums in matter in response to mechanical stress (deformation). This phenomenon may or may not be associated with stress whitening of the material. These cavitations may eventually lead to the appearance of cracks and a loss of tightness of the polymeric sheath.

The use of thermoplastic materials in flexible pipes is summarized in section 6.2.2 of API RP 17B (2008).

The development of cheaper alternative inner polymer sheaths with properties compatible with their use in contact with high temperature hydrocarbons (low swelling, low sensitivity to cavitation, good mechanical resistance, especially creep . . . , good chemical resistance to hydrocarbon components), is sought.

The application WO 2013/128097 discloses an underwater flexible pipe for the transport of hydrocarbons in deep water comprising an inner polymeric sealing sheath. Polypropylene is mentioned in a long list of polymers that may be used for this sheath.

Polypropylene is used in the offshore oil industry. In fact, it is widely used for its thermal insulation properties (its thermal conductivity is close to 0.2 W/m/K). It is also used for tubes intended for the transport of water or gas. These are subjected to pressures and temperatures much lower than the pipes intended for the transport of hydrocarbons, while the mechanical stresses are lower. In fact, the pipes intended for the transport of hydrocarbons are dynamic and may be subjected to loads (thermal shocks, dynamism) at low temperature (in particular during a shutdown of production). Furthermore, upon extruding on a mechanical support such as a metal carcass, the polymer undergoes significant shrinkage stresses. These hoop constraints may be of such a nature as to make the phenomenon of rapid crack propagation possible. The polymer must therefore be resistant to cold shocks in order to prevent fracture and the so-called crack propagation. A polymer designed to form the sheath of a pipe for the transport of gas or hydrocarbons is not necessarily suitable to form the sheath of an underwater flexible pipe for the transport of hydrocarbons.

In this regard, polypropylenes are not used in applications in which they could be in contact with hydrocarbons.

A polymer has more or less affinity with a given fluid/solvent. When the affinity of the polymer with a fluid is significant, the polymer swells, delaminates, and may even partially or completely dissolve in the fluid, wherein these phenomena are all the more exacerbated when the temperature is significant. In this case, the technical data sheets of the suppliers advise against the use of polypropylenes in contact with the hydrocarbons insofar as polypropylene is described therein as being incompatible with hydrocarbon compounds, in particular at high temperatures. Upon contact with hydrocarbons, a matrix based on polypropylene has a tendency to swell. Polypropylenes may dissolve partially or completely in oils at high temperatures by swelling and/or delamination phenomena.

In addition, polypropylene is subject to blistering, a phenomenon which occurs after saturation of the material in hydrocarbons followed by a more or less rapid depressurization, which is problematic for use in the layer of a pipe. More specifically, in a pipe, the sealing sheath of polymer material is used to transport fluids comprising crude oil, water and gas under pressure and at temperature. Under these conditions of use, the polymer material of the sealing sheath absorbs the gases and oils contained in the petroleum fluid according to their chemical nature (via their solubility coefficient) and the partial pressure of each of them. The saturation time of the polymer, the balancing of the system, depends in turn on the diffusion coefficients and, therefore, essentially on the temperature. If the pressure in the pipe decreases, the absorbed gases tend to exit the polymer in order to maintain the balance between the internal and external concentrations. If the break in balance is very fast, faster than the rate of diffusion of gases from the polymer (as in the case of a production shut-down), the system is no longer in balance. The supersaturation of gas in the polymer sheath leads to gas concentration and temperature gradients which may cause more or less rapid gas decompression that may lead to irreversible damage such as the appearance of blisters or cracks or the formation of a uniformly-distributed microporosity in the thickness of the material. Thus, the appearance of blisters is due to the trapping of soluble gases within the sheath, or the too rapid decompression of the pipe that does not allow the gas to exit the sheath. This phenomenon of blistering may be catastrophic for the sealing sheath, and thus for the underwater pipe that contains it, since it can lead to the loss of its sealing function.

These drawbacks of polypropylene have led those skilled in the art to abandon polypropylene as a polymer for an inner sealing sheath in contact with hydrocarbons in favor of the thermoplastic polymers mentioned above.

SUMMARY OF THE INVENTION

One of the objects of the present invention is to provide an underwater pipe for the transport of hydrocarbons whose inner polymeric sealing sheath is less expensive than polyamide or polyvinylidene fluoride sheaths, while experiencing low swelling and/or low blistering upon contact with hydrocarbons at elevated temperatures, typically above 90° C.

For this purpose, the invention has a first object of providing an underwater pipe intended for the transport of hydrocarbons and comprising a metal reinforcing layer around an inner polymeric sealing sheath capable of being in contact with hydrocarbons, wherein the inner polymeric sealing sheath comprises a homopolymer polypropylene or a mixture of homopolymeric polypropylenes, wherein the homopolymer polypropylene or the mixture has:
   a density (according to ISO 1183 revised in 2012) of more than 0.900 g/cm$^3$, and
   an index melt (also called melt index (MI), melt flow index (MFI), melt flow rate (MFR) (according to ISO 1133 revised in 2011) measured at 230° C. under a mass of 2.16 kg of less than 10 g/10 minutes.

DESCRIPTION OF PREFERRED EMBODIMENTS

The term "inner polymeric sealing sheath capable of being in contact with hydrocarbons" or "layer capable of being in contact with hydrocarbons" is understood to mean that the sheath or layer comes into contact with hydrocarbons when the pipe is put into operation. Thus, the pipe does not include an inner tubular layer (i.e. a hydrocarbon-proof layer) which would prevent contact between the hydrocarbons and the sheath or the layer. Typically, the pipe according to the invention does not comprise a metal tube or a polymeric tubular layer coated by the inner polymeric sealing sheath.

However, the pipe according to the invention may comprise one (or more) tubular layers coated by the inner polymeric sealing sheath if the tubular layer(s) is/are not hydrocarbon-proof. For example, the underwater pipe may comprise a tubular layer consisting of wound longitudinal elements (for example a metal carcass) coated by the inner polymeric sealing sheath, because the hydrocarbons can pass through the longitudinal elements.

Of course, the pipe may comprise tubular layers (metal and/or polymeric) around the inner polymeric sealing sheath and/or around the reinforcing layer, in particular, as described below.

There are three main classes of polypropylene, namely, homopolymers (PPH), block copolymers (also known as impact copolymer) (PPB) and random copolymers (PPR) (these designations are according to the standards ISO 15013 revised in 2015 and ISO 1873-2 revised in 2011). Typically PPH consist of at least 97%, in particular at least 98%, typically at least 99%, preferably at least 99.8% and advantageously exclusively of a chain of propylene units. The proportion of propylene units may, in particular, be determined by Fourier transform infrared spectroscopy.

Against all odds and against the prejudices mentioned above, it has been discovered that a specific selection of a grade of polypropylene, namely homopolymers having a specific melt index and density, does not present the drawbacks of swelling and blistering mentioned above, and is therefore suitable for use in an inner polymeric sealing sheath that is intended to come into contact with hydrocarbons.

When the inner polymeric sealing sheath comprises a mixture of homopolymeric polypropylenes, it is not mandatory that each homopolymeric polypropylene it contains has the density and melt index as defined in the present application. It is sufficient that the mixture has these properties. In a particular embodiment, each homopolymeric polypropylene of the homopolymeric polypropylene mixture has a density and a melt index as defined herein.

The inner polymeric sealing sheath comprises a homopolymeric polypropylene or a mixture of homopolymeric polypropylenes whose density (according to ISO 1183 revised in 2012) is greater than 0.900 g/cm$^3$, typically greater than 0.902 g/cm$^3$, especially greater than 0.905 g/cm$^3$, preferably greater than 0.910 g/cm$^3$. Such densities allow the homopolymer or the mixture (and thus the inner polymeric sealing sheath) to have a swelling ratio and resistance to blistering in the presence of hydrocarbons at high temperature that are compatible with the use of the sheath as a sealing sheath that is intended to be in contact with hydrocarbons in a pipe for the transport of hydrocarbons.

The inner polymeric sealing sheath comprises a homopolymeric polypropylene or a mixture of homopolymeric polypropylenes whose melt index (according to ISO 1133 revised in 2011) measured at 230° C. under a mass of 2.16 kg is less than 10 g/10 minutes, typically less than 5 g/10 minutes, especially less than 2 g/10 minutes, preferably less than 0.5 g/10 minutes. Such melt indices in fact allow the preparation of the sheath by extrusion in diameters greater than 40 cm.

Generally, homopolymeric polypropylene or the homopolymeric polypropylene mixture of the inner polymer sheath of the pipe has:
- a density (according to ISO 1183 revised in 2012) of not more than 0.915 g/cm$^3$, and/or
- a melt index (according to ISO 1133 revised in 2011) measured at 230° C. under a mass of 2.16 kg of greater than 0.1 g/10 minutes.

By way of example of homopolymeric polypropylenes having these properties, mention may be made of these homopolymeric polypropylenes:
- Hostallen PPH 2250 36 from Lyondellbasell with a density of 0.915 and an MFR of 0.3 measured at 230° C. and 2.16 kg,
- PPH 3060 from TOTAL with a density of 0.905 and a melt index of 1.8 measured at 230° C. and under 2.16 kg,
- BE60-7032 from Borealis with a density of 0.905 and a melt index of 0.3 measured at 230° C. and under 2.16 kg, or
- PP 531P from Sabic with a density of 0.905 and a melt index of 0.3 measured at 230° C. and under 2.16 kg Preferably, the polypropylene homopolymer or the mixture of homopolymeric polypropylenes of the inner polymeric pipe sheath has a melting temperature (considering the peak corresponding to the highest melting temperature in differential scanning calorimetry (DSC) according to ISO 11357-3 of 2011) of at least 145° C., in particular at least 150° C., typically at least 155° C., and preferably at least 160° C. Generally, there is a coexistence of alpha and beta type crystalline morphologies in homopolymeric polypropylene so there are always two melting peaks in DSC. The peak corresponding to the highest melting temperature is taken into account in the application.

Preferably, the homopolymeric polypropylene has a degree of crystallinity of at least 40%, typically at least 50%, or the homopolymeric polypropylene mixture comprises at least one homopolymeric polypropylene having a degree of crystallinity of at least 40%, typically at least 50% (or each homopolymeric polypropylene of the homopolymeric polypropylene mixture has a crystallinity level of at least 40%, typically of at least 50%). The degree of crystallinity may be calculated by dividing the heat of fusion of the homopolymeric polypropylene by the heat of fusion of a 100% crystalline homopolymeric polypropylene, generally estimated at 209 joules/gram.

Such melting temperatures and crystallinity levels contribute to the fact that the homopolymeric polypropylene or the mixture, and thus the internal polymeric sealing sheath, exhibit a swelling ratio and resistance to blistering in the presence of high temperature hydrocarbons that make it compatible with the use of the sheath as a sealing sheath intended to be in contact with hydrocarbons in a pipe for the transport of hydrocarbons.

Thus, typically, the homopolymeric polypropylene or the mixture of homopolymeric polypropylenes of the inner polymeric pipe sheath has a swelling ratio of less than 30% by weight when contacted with Biofree EN 590 diesel at 110° C. for 6 hours. Typically, the swelling ratio is measured by weighing the M mass of a sheath sample before contacting Biofree EN 590 diesel. This sample is then contacted with Biofree EN 590 diesel at 110° C. for 6 hours, and then its $M_{final}$ mass is measured. The swelling ratio is then $(M_{final}-M_{initial})/M_{initial}$.

Depending on the conformation of the methyl group on the asymmetric carbon of the propylene homopolymer, reference is made to:
- atacticity, i.e. that the distribution of the methyl group is at random on the plane;
- syndiotacticity, i.e. that the distribution of the methyl group is on both sides of the plane;
- isotacticity, i.e. that the distribution of the methyl group is on the same side of the plane.

Preferably, the homopolymeric polypropylene is an isotactic homopolymeric polypropylene, or the homopolymeric polypropylene mixture comprises at least one isotactic homopolymeric polypropylene (or each homopolymeric polypropylene of the homopolymeric polypropylene mixture is an isotactic homopolymeric polypropylene). The isotactic homopolymeric polypropylenes advantageously have the characteristics of density, crystallinity rate and melting temperatures defined above. Indeed, the density of an isotactic homopolymeric polypropylene is between 0.900 and 0.910, while that of the atactic or syndiotactic homopolymeric polypropylene is between 0.890 and 0.905. In addition, the degree of crystallinity of an isotactic homopolymeric polypropylene is generally greater than 40%, or even greater than 70%, whereas that of a syndiotactic homopolymeric polypropylene is generally between 20 and 30%, and in that atactic homopolymeric polypropylenes exhibit a very low degree of crystallinity. Finally, the melting temperature of an isotactic homopolymeric polypropylene is greater than 150° C. and up to 171° C. for perfectly isotactic grades.

Typically, the isotacticity ratio of the isotactic homopolymeric polypropylene (or of the at least one of the isotactic homopolymeric polypropylenes of the homopolymeric polypropylene mixture, or of each isotactic homopolymeric polypropylene of the homopolymeric polypropylene mixture) is at least 93%, in particular at least 95%, preferably at least 98%. The tacticity ratio is usually measured by nuclear magnetic resonance (NMR). These isotacticity ratios make it possible to obtain the high levels of crystallinity described above. By way of comparison, generally, the isotacticity ratio of the isotactic homopolymeric polypropylene not having high crystallinity, ranges from 90 to 93%.

The mechanical properties of the inner pipe sealing sheath when cold are also important. Indeed, the temperatures on the production and storage sites of the pipe may be particularly low, for example between −20° C. and 30° C., while the sheath must preserve its characteristics at such temperatures. However, isotactic homopolymeric polypropylenes are brittle when cold. Specifically, it is known that a homopolymeric polypropylene has rather poor performance when cold, both in terms of impact resistance and elongation at break. Thus, by way of example, the elongation at break of the Hostallen PPH 2250 36 grade from Lyondellbasell is only 20% at 0° C., while its impact strength on the notched specimen is of the order of 6 kJ/m$^2$ at 0° C. In addition, large size spherulites may form and lead to a loss of mechanical properties during the preparation and cooling of a homopolymeric polypropylene-based part of a certain thickness.

Generally, the crystalline morphology of the isotactic homopolymeric polypropylene is greater than 50% of the beta and/or alpha type, or the crystalline morphology of at least one isotactic homopolymeric polypropylene of the homopolymeric polypropylene mixture is greater than 50% of the beta type and/or alpha type (or the crystalline morphology of each homopolymeric polypropylene of the homopolymeric polypropylene mixture is more than 50% of the beta and/or alpha type). The presence and proportion of alpha or beta types may be measured by Differential Scanning calorimetry (DSC). Indeed, such homopolymeric polypropylenes offer improved mechanical performance when cold, including improved impact strength and elongation at break. A part prepared from an isotactic homopolymeric polypropylene having a crystalline morphology of the beta and/or alpha type, has smaller-size spherolites. The structure of such an isotactic homopolymer is thinner and more homogeneous, which has a favorable impact on the strength, the notched specimen resistance, and the weldability of the material. Such a structure is generally obtained by preparing the polypropylene(s) by polymerization in the presence of a betagenic nucleating agent (which promotes the formation of beta-type crystals), or an alphagenic nucleating agent (which promotes the formation of alpha-type crystals). The above-mentioned advantages obtained through the use of nucleating agents are seen in particular in the case of parts of high thicknesses, which is the case for the inner polymeric sealing sheath which may have a thickness of up to 150 mm.

Generally, the crystalline morphology of the isotactic homopolymeric polypropylene is greater than 50% of the beta type, or the crystalline morphology of at least one isotactic homopolymeric polypropylene of the homopolymeric polypropylene mixture is greater than 50% of the beta type (or the crystalline morphology of each homopolymeric polypropylene of the homopolymeric polypropylene mixture is more than 50% of the beta type). Indeed, the alpha crystalline morphology has a coarse grain structure between the spherulites, which can lead to a brittle rupture of the polypropylene upon external stress. The molecular arrangement of the beta crystalline form allows an improvement of the impact and deformation properties of polypropylene with respect to the alpha phase. By way of example, mention may be made of homopolymeric polypropylene of Borealis Beta(ß)-PP BE60-7032, which is a homopolymer with a high molecular weight of polypropylene, with a high viscosity and whose crystalline structure has been modified. With this homopolymeric polypropylene, an impact strength on notched specimens of the order of 5 kJ/m$^2$ at $-20°$ C., and elongation at break of greater than 100% at 0° C. is obtained, which is compatible with the use of the sheath as a polymeric sheath for sealing a pipe. Such a structure is generally obtained by preparing the polypropylene(s) by polymerization in the presence of a betagenic nucleating agent.

Thus, the polymeric pipe sealing sheath according to the present invention comprises a homopolymeric polypropylene or a mixture of homopolymeric polypropylenes having good impact resistance and good elongation at break at low temperature, which is particularly advantageous in the case where the pipe is a flexible pipe with a rough bore comprising a metal carcass. Indeed, the production of such a pipe involves extruding the polymeric sheath around the metal carcass. However, the outer face of the metal carcass is not smooth because it has at least one helical groove of generally large size, typically several millimeters in width and depth. As a result, during the extrusion of the inner polymeric sealing sheath, the molten polymer tends to flow inside this groove so that after cooling, the inner face of the inner polymeric sealing sheath comprises complementary geometrical protrusions of the grooves of the metal carcass. In addition, these geometrical irregularities of the inner face of the inner polymeric sealing sheath may generate high concentrations of stresses and mechanical deformations applied locally to the polymer material, in particular when the flexible pipe is wound on a small diameter coil, as is done several times during its manufacture. Since these winding and unwinding operations have to able to be done in winter when the temperature is low, it is necessary that the inner polymeric sealing sheath is sufficiently ductile at low temperature to support these operations without damage, despite the stress and strain concentrations related to the presence of the metal carcass. As a result, the good mechanical properties of the homopolymeric polypropylenes according to the present invention at low temperature, make it advantageously possible to use these materials to produce the inner polymeric sealing sheath for flexible pipes comprising a metal carcass.

The homopolymeric polypropylenes used in the inner polymeric pipe sealing sheath according to the invention are commercially available or may be prepared by processes known to those skilled in the art, in particular by Ziegler-Natta catalysis, by metallocene catalysis or any other type of catalysis.

Preferably, the homopolymeric polypropylene is a homopolymer of the monomodal type, or the homopolymeric polypropylene mixture comprises at least one monomodal homopolymer (or each homopolymeric polypropylene of the homopolymeric polypropylene mixture is a monomodal homopolymer). Homopolymers of the monomodal type are generally prepared by a single-stage process, for example in a single reactor, such as a slurry reactor or loop reactor.

The homopolymeric polypropylene may also be a multimodal homopolymer (for example bimodal), or the homopolymeric polypropylene mixture may comprise at least one multimodal homopolymer (for example bimodal) (or each homopolymeric polypropylene of the homopolymeric polypropylene mixture may be a homopolymer multimodal type (for example bimodal)). A multi-step preparation process may then be used, for example in a loop-gas phase process, such as the BORSTAR® process from Borealis A/S or the Spheripol® process. from Basell.

The monomodal or multimodal nature of a polypropylene may be determined by plotting the curve of its molecular weight fraction as a function of its molecular weight. When this curve has several maxima, the homopolymeric polypropylene is multimodal. When it has only one maxima, it is monomodal.

Preferably, the homopolymeric polypropylene may be obtained by polymerization in the presence of a betagenic nucleating agent (which promotes the formation of beta-type crystals) and/or an alphagenic nucleating agent (which promotes the formation of alpha-type crystals), or the homopolymeric polypropylene mixture may comprise at least one propylene homopolymer obtainable by polymerization in the presence of a betagenic and/or an alphagenic nucleating agent (or each homopolymeric polypropylene of the homopolymeric polypropylene mixture may be obtained by polymerization in the presence of a betagenic and/or alphagenic nucleating agent). This agent may be introduced at any time, typically after the polymerization (for example during granulation) or may be added during the polymerization step. The addition of such a nucleating agent influences the formation of the polypropylene structure upon cooling of the molten polypropylene mass to produce a thinner and more homogeneous structure. The nucleating agents of the alphagenic and/or betagenic type make it possible to obtain smaller-size spherulites inside the polypropylene than when such agents are absent. Thus, their presence has a favorable impact on the strength, the notched specimen resistance, and the weldability of the resulting polypropylene sheath. The use of a betagenic nucleating agent is particularly preferred since the propylene so obtained has improved impact and deformation properties, as indicated above. There are alternative methods that may be used to obtain a polypropylene of beta crystalline morphology, for example by transformation/cooling, but such a process is generally more complex.

The homopolymeric polypropylene forming the pipe may be crosslinked, or the homopolymeric polypropylene mixture may comprise at least one crosslinked homopolymeric polypropylene (or each homopolymeric polypropylene of the homopolymeric polypropylene mixture may be crosslinked).

The homopolymeric polypropylene of the pipe may be uncrosslinked, or the homopolymeric polypropylene mixture may comprise at least one uncrosslinked homopolymeric polypropylene (or each homopolymeric polypropylene of the homopolymeric polypropylene mixture may be uncrosslinked).

In one embodiment, the inner polymeric sealing sheath is multilayer, for example two-layer or three-layer, wherein it should be understood that at least the layer that may be in contact with the hydrocarbons comprises homopolymeric polypropylene as defined above, or the mixture of homopolymeric polypropylenes as defined above. The layer capable of being in contact with the hydrocarbons of the inner polymeric sealing sheath is the innermost layer of the sheath.

Preferably, the inner polymeric sealing sheath comprises only one layer.

The inner polymeric pipe sealing sheath comprising a homopolymeric polypropylene or a homopolymeric polypropylene mixture according to the invention (or at least the inner layer of the inner polymeric sealing sheath when it is multilayer) typically comprises:
a polymeric matrix, and
optionally, discontinuously dispersed components in the polymeric matrix.

The term "polymeric matrix" is understood to mean the continuous polymeric phase which forms the inner polymeric sealing sheath (or the layer of the inner polymeric sealing sheath). The polymeric matrix is a continuous matrix. The inner polymeric sheath (or layer) may optionally comprise discontinuously-dispersed components in the polymeric matrix, but which are not part of the polymeric matrix. Such components may, for example, be fillers such as fibers.

The polymeric matrix of the inner polymeric sheath (or the inner layer of the inner polymeric sealing sheath when it is multilayered) is generally obtained by extrusion of one or more polymers (which form the polymeric matrix), and possibly additives (masterbatch). During the extrusion, some additives are incorporated in the polymer matrix, while others do not mix with the polymers forming the polymeric matrix and disperse discontinuously in the polymer matrix, to form discontinuously-dispersed components in the polymeric matrix.

According to a first alternative, the pipe according to the invention comprises at least one inner polymeric sealing sheath, the polymer matrix of which comprises a homopolymeric polypropylene or a mixture of homopolymeric polypropylenes. If the inner polymeric sealing sheath is multilayer, the polymeric matrix of at least the inner layer of the sheath comprises a homopolymeric polypropylene or a mixture of polypropylenes homopolymers.

According to this alternative, the inner polymeric sheath whose polymer matrix comprises a homopolymeric polypropylene or a mixture of homopolymeric polypropylenes, is generally obtained by extrusion of one or more polymers (which form the polymeric matrix), wherein at least one of them is a homopolymeric polypropylene, and, optionally, in the presence of additives. If the inner polymer sheath is multilayer, its inner layer is generally obtained by coextrusion of one the one hand one or more polymers (which form(s) the polymeric matrix of the inner layer), wherein at least one of them is a homopolymeric polypropylene, optionally in the presence of additives, and, on the other hand, another or other polymer(s) which form the other layer(s) of the inner multilayer polymeric sealing sheath.

The discontinuously-dispersed components in the polymeric matrix may optionally comprise polymers, for example a homopolymeric polypropylene or a mixture of homopolymeric polypropylenes. This being so, a pipe:
comprising a polymeric sealing sheath comprising a component dispersed discontinuously in the polymeric matrix (in particular fillers such as fibers) comprising or consisting of a homopolymeric polypropylene or a mixture of homopolymeric polypropylenes,
but whose polymeric matrix is free of a homopolymeric polypropylene or a mixture of homopolymeric polypropylenes,
does not meet the definition of a pipe comprising at least one polymeric sealing sheath whose polymeric matrix comprises a homopolymeric polypropylene or a homopolymeric polypropylene mixture, as defined in this first alternative.

According to a second alternative, the pipe according to the invention may comprise at least one inner polymeric sealing sheath comprising a discontinuously-dispersed component in the polymeric matrix, said component comprising a homopolymeric polypropylene or a mixture of homopolymeric polypropylenes. If the inner polymeric sheath is multilayer, then at least its inner layer comprises a discontinuously-dispersed component in the polymeric matrix, wherein the component comprises a homopolymeric polypropylene or a mixture of homopolymeric polypropylenes.

According to this second alternative, a discontinuously-dispersed component in the polymeric matrix of the inner polymeric sealing sheath (or at least its inner layer when the sheath is multilayer) comprises a homopolymeric polypropylene or a mixture of homopolymeric polypropylenes. The component may be a filler such as a fiber. The component comprising a homopolymeric polypropylene or a mixture of homopolymeric polypropylenes is generally one of the additives of the masterbatch used during the extrusion. According to this second alternative, the polymeric matrix of the inner polymeric sealing sheath may be free of homopolymeric polypropylene.

According to a third alternative, the pipe according to the invention may comprise at least one inner polymeric sealing sheath comprising a discontinuously-dispersed component in the polymeric matrix, wherein the component comprises a homopolymeric polypropylene or a mixture of homopolymeric polypropylenes and whose polymer matrix comprises a homopolymeric polypropylene or a mixture of homopolymeric polypropylenes. If the inner polymer sheath is multilayer, at least its inner layer comprises a discontinuously-dispersed component in the polymeric matrix, wherein the component comprising a homopolymeric polypropylene or a mixture of homopolymeric polypropylenes, and the polymeric matrix of at least its inner layer comprises a homopolymeric polypropylene or a mixture of homopolymeric polypropylenes.

According to this third alternative, the homopolymeric polypropylene or the homopolymeric polypropylene mixture is therefore present both in the polymer matrix and in a component dispersed discontinuously in the polymer matrix.

Generally, the weight proportion of the homopolymeric polypropylene or of the homopolymeric polypropylene mixture in the inner polymeric sheath (or in at least the inner layer of the sheath when the inner polymeric sheath is multilayer) is greater than 50% by weight, in particular greater than 70% by weight relative to the inner polymeric sealing sheath.

The inner polymeric sealing sheath (or at least the inner layer of the sheath when the inner polymeric sheath is multilayer) may also include a plasticizer, which may limit the swelling rate of the sheath upon contact with hydrocarbons in addition to improving the cold performance of the sheath (thanks to the lowering of the glass transition temperature by 10° C., or even 25° C. as may be measured by DSC). Without wishing to be bound by a particular theory, the limitation of the swelling rate of the sheath upon contact with the hydrocarbons could be explained by the fact that, under the normal conditions of use of the inner sealing sheath, the plasticizer would tend to escape from the sheath which would lead to a mass loss in the sheath, which would be offset by hydrocarbons that have a high affinity with the homopolymeric polypropylene. For example, in the case of a sheath having a predictable swelling rate of 30%, an addition of 10% by mass of plasticizer could lead to a final effective swelling of 20%.

The plasticizer may, for example, be chosen from the compounds defined in the book *Handbook of Plasticizers* edited by Georges Wypych. Examples include dibutyl sebacate, dioctyl phthalate, N-n-butylsulfonamide, polymeric polyesters and combinations thereof.

Advantageously, the inner polymeric sealing sheath comprises between 0% and 20% by weight of plasticizer, preferably between 1% and 10% by weight of plasticizer.

The inner polymeric sealing sheath (or at least the inner layer of the sheath when the inner polymeric sheath is multilayer) may also include a shock modifier, which improves its cold behavior. Examples of shock modifiers are described in the literature. The following commercial references are nonlimiting: Exact™ plastomer from Exxon Mobil, Novalene from Nova polymers Inc., Engage™ 8100 from Dow Chemical, etc.

The inner polymeric sealing sheath comprises between 0% and 20% shock modifier and preferably between 1% and 10% shock modifier.

The inner polymeric sealing sheath comprising a homopolymeric polypropylene or a mixture of homopolymeric polypropylenes (or at least the inner layer of the sheath when the inner polymeric sheath is multilayer) may comprise other additives, such as antioxidants, anti-UV, reinforcing fillers, manufacturing aids and other fillers usually used in thermoplastics.

Typically, the inner polymeric sealing sheath (or at least the inner layer of the sheath when the inner polymeric sheath is multilayer) consists of:
  50 to 100% by weight of homopolymeric polypropylene or a mixture of homopolymeric polypropylenes,
  0 to 20% by weight of plasticizer,
  0 to 20% by weight of shock modifier,
  0 to 10% by weight of additives.

The underwater pipe according to the invention may be rigid or flexible. Typically, the minimum bend radius (MBR) of a rigid pipe is 10 times greater than that of a flexible pipe. Given the MBR of a flexible pipe, its inner sealing sheath may be subject to significant stressful bending. The mechanical characteristics of the flexible pipe must allow it to respond to forces (due to the winding of the flexible pipe with radii of curvature 10 times smaller than a rigid pipe) that are greater than those to which a rigid pipe is subjected.

According to a first alternative, the underwater pipe according to the invention is flexible. Generally, its metal reinforcing layer is then constituted by a long-pitch winding of at least one non-contiguous wire, typically a tensile armor ply.

The flexible pipe typically comprises, from the outside to the inside of the pipe:
  at least one tensile armor ply as reinforcing layer,
  the inner polymeric sealing sheath,
  possibly a metal carcass.

If the pipe comprises a metal carcass, it is said to have a rough-bore. If the pipe is free of a metal carcass, it is said to be smooth-bore.

The main function of the metal carcass is to take up radial forces directed from the outside to the inside of the pipe in order to avoid the collapse of all or part of the pipe under the effect of these forces. These forces are, in particular, related to hydrostatic pressure exerted by seawater when the flexible pipe is submerged. Thus, the hydrostatic pressure may reach a very high level when the pipe is immersed at great depth, for example 200 bar when the pipe is submerged at a depth of 2000 m, so that it is then often necessary to equip the flexible pipe with a metal carcass.

When the flexible pipe comprises an outer polymeric sheath, the metal carcass also has the function of preventing the collapse of the inner polymeric sealing sheath upon rapid decompression of a flexible pipe having transported hydrocarbons. Indeed, the gases contained in the hydrocarbons diffuse slowly through the inner polymeric sealing sheath and are found partly trapped in the annular space between the inner polymeric sealing sheath and the outer polymeric sheath. As a result, during a production shut-down resulting in rapid decompression of the inside of the flexible pipe, the pressure in this annular space may temporarily become significantly greater than the pressure inside the pipe, which, in the absence of a metal carcass, would lead to the collapse of the inner polymeric sealing sheath.

As a result, generally, for the transport of hydrocarbons, a pipe comprising a metal carcass is preferred, whereas a pipe without a metal carcass is suitable for the transport of water and/or water vapor under pressure. In addition, when the pipe is intended both to carry hydrocarbons and to be submerged at great depth, then the metal carcass becomes indispensable in most applications.

The metal carcass consists of longitudinal elements wound helically with a short pitch. These longitudinal elements are stainless steel strips or wire arranged in turns and stapled to each other. Advantageously, the metal carcass is made by profiling an S-shaped strip and then winding it in a helix in order to staple the adjacent turns together.

In the present application, the concept of short-pitch winding designates any helical winding at a helix angle close to 90°, typically between 75° and 90°. The concept of long-pitch winding covers helical angles less than 60°, typically between 20° and 60° for armor plies.

The tensile armor plies consist of metal or composite wire wound in a long pitch and their main function is to take up the axial forces related, on the one hand, to the inner pressure inside the flexible pipe and, on the other hand, the weight of the flexible pipe, in particular when it is suspended. The presence of an additional metallic reinforcing layer that is intended to take up the radial forces related to the inner pressure, in particular a so-called "pressure vault" layer, is not indispensable when the helix angles of the wires constituting the layers of tensile armor are close to 55°. Indeed, this particular helix angle gives the tensile armor plies the ability to take up, in addition to axial forces, the radial forces exerted on the flexible pipe and directed from the inside to the outside of the pipe.

In a preferred manner, and, in particular, for applications at great depth, in addition to the tensile armor plies, the flexible pipe may comprise a pressure vault interposed between the inner polymeric sheath and the tensile armor plies. In such a case, the radial forces exerted on the flexible pipe, in particular the radial forces directed from the inside towards the outside of the pipe, are taken up by the pressure vault in order to avoid the bursting of the inner polymeric sheath under the effect of the pressure prevailing inside the pipe. The pressure vault consists of longitudinal elements wound with a short pitch, for example metal wires of Z (zeta), C, T (theta), U, K or X form, arranged in turns stapled to each other.

Advantageously and, in particular, as a function of the grade of the constituent metallic material of the tensile armor plies and of the possible pressure vault, the flexible conduit may comprise an outer polymeric sealing sheath to prevent seawater from entering within the flexible pipe. This makes it possible, in particular, to protect the tensile armor plies from seawater and to prevent the phenomenon of corrosion by seawater.

The nature, number, sizing and organization of the layers constituting the flexible pipes are essentially related to their conditions of use and installation. The pipes may comprise additional layers to those mentioned above.

These flexible pipes are particularly suitable for the transport of fluids, especially hydrocarbons on the seabed and at great depths. More precisely, they are referred to as unbonded and are so described in the normative documents published by the American Petroleum Institute (API), API 17J (3rd edition—Jan. 1, 2009) and API RP 17B. (4th edition—July 2008).

Flexible pipes may be used at great depth, typically up to 3000 meters deep. They allow the transport of fluids, especially hydrocarbons, having a temperature typically reaching 130° C., and may even exceed 150° C., with an inner pressure of up to 1000 bar or 1500 bar.

The inner polymeric sheath of the flexible pipe is typically tubular, and generally has a diameter of 50 mm to 600 mm, preferably 50 to 400 mm, and/or a thickness of 1 mm to 150 mm, preferably 4 to 15 mm and/or a length of 1 m to 10 km.

According to a second alternative, the underwater pipe according to the invention is rigid. Typically, it then comprises, from the outside towards the inside, a metal reinforcing layer and the inner polymeric sealing sheath comprising a homopolymeric polypropylene or a mixture of homopolymeric polypropylenes with density and melt indices as defined above (FIG. 2).

The inner polymeric sealing sheath then corresponds to the "liner" of the rigid pipe. It typically has a thickness up to 15 mm. The outer diameter of the inner polymeric sealing sheath is generally between 10 cm and 130 cm.

The metal reinforcing layer of the rigid pipe is generally made of a metal tube. The metal reinforcing layer is, for example, made of steel, stainless steel and/or other steels with variable nickel content.

The rigid pipe may further comprise an envelope for thermal insulation and/or protection, and which may be in the form of a steel outer tube or in the form of a polymer layer.

More particularly, a rigid pipe typically comprises a set of sections arranged end to end, wherein each has a length generally between 12 m and 96 m. The thermal insulation and/or protection envelope is typically a melt-bonded epoxy, polypropylene or polyethylene layer, and typically of a thickness between 2 mm and 4 mm, or a steel tube.

A pipe comprising an inner polymeric sealing sheath comprising a homopolymeric polypropylene or a mixture of homopolymeric polypropylenes has the following advantages:

- the inner polymeric sealing sheath has a swelling rate and resistance to blistering when it is brought into contact with hydrocarbons at high temperatures that are compatible with its use as a inner polymeric pipe sealing sheath for the transport of hydrocarbons. In particular, the inner polymeric sealing sheath is able to withstand violent decompressions, as observed during production shut-downs, with good resistance to blistering.
- Its swelling rate is lower and its resistance to blistering is improved compared to a sheath based on a different propylene (PPB, PPR or PPH not having the density and melt index characteristics defined in the application).
- The inner polymeric sealing sheath is much cheaper (up to 15 times less) than an inner sealing sheath based on polyamide or PVDF.
- The inner polymeric sealing sheath does not exhibit chemical aging, unlike a polyamide sheath.
- The inner polymeric sealing sheath is usable in a flexible pipe of the "smooth bore" as "rough bore" type,
- Polypropylene has thermal insulation properties superior to polyamide or polyethylene. Thus, it eliminates an insulating sheath that is usually added to the pipes.

According to a second object, the invention relates to a method for preparing the underwater pipe defined above, comprising the following steps:

a) extrusion to form the inner polymeric sealing sheath comprising the homopolymeric polypropylene or the homopolymeric polypropylene mixture, wherein the extrusion is possibly carried out on another layer, b) assembling the inner polymeric sealing sheath obtained in step a) with the metal reinforcing layer.

The extrusion step a) may be carried out by any method known to those skilled in the art, for example using a single screw or twin screw extruder.

A polymeric matrix comprising a homopolymeric polypropylene or a mixture of homopolymeric polypropylenes may easily be extruded. When the inner polymeric sealing sheath comprises several polymers, the mixture of the two polymers may be made before or during extrusion.

When the inner polymeric sheath is multilayer, the inner layer comprising homopolymeric polypropylene or a homopolymeric polypropylene mixture, may easily be coextruded with the other layer(s) of the inner polymeric sealing sheath.

When the homopolymeric polypropylene of the pipe is crosslinked, or when the homopolymeric polypropylene mixture comprises at least one crosslinked homopolymeric polypropylene, the method comprises an additional step c) of crosslinking.

Depending on the crosslinking pathways, the c) crosslinking step may be carried out through a wet or heated pathway before or after the step b) of assembly.

For example, the crosslinking may be obtained by the peroxide pathway. The extrusion step a) is then carried out in the presence of a crosslinking initiator making it possible to generate free radicals, typically a peroxide. The peroxide is advantageously chosen as a function of the extrusion parameters of the homopolymeric polypropylene or of the homopolymeric polypropylene mixture. For example, the activation temperature should preferably be greater than the extrusion temperature of the homopolymeric polypropylene or homopolymeric polypropylene mixture according to the invention in order to prevent crosslinking from occurring during the extrusion step a). The crosslinking step c) is then carried out thermally. For example, an infrared radiation oven is arranged at the extrusion line outlet in order to thermally activate the crosslinking. The assembly step b) is then performed.

Alternatively, the crosslinking may be obtained by the silane pathway. According to this crosslinking pathway, the extrusion step a) is carried out with a homopolymeric polypropylene or a homopolymeric polypropylene mixture onto which has previously been grafted one or more alkoxy-silane groups. Advantageously, the homopolymeric polypropylene or homopolymeric polypropylene mixture to which one or more alkoxy-silane groups has previously been grafted has a melt index measured at 230° C. under a mass of 2.16 kg of less than 10 g/10 minutes, advantageously less than 5 g/10 minutes, typically less than 5 g/10 minutes, in particular less than 2 g/10 minutes, preferably less than 0.5 g/10 minutes. The c) crosslinking step is carried out wet after the extrusion step a) and advantageously after the assembly step b). For example, water is circulated inside the pipe obtained in step b). In order to promote crosslinking, wherein the temperature of the circulating water is generally greater than 80° C., greater than 100° C. and advantageously greater than 120° C.

The grafting of one or more alkoxy-silane groups onto the homopolymeric polypropylene or onto the homopolymeric polypropylene mixture may be carried out according to several methods known to those skilled in the art. For example, the homopolymeric polypropylene or the homopolymeric polypropylene mixture may be extruded in the form of a rod in the presence of a crosslinking initiator making it possible to generate free radicals, wherein a monomer has one or more alkoxy-silane groups, and a catalyst. The catalyst is mainly preserved so that it does not generate radicals within the extruder. At the extrusion outlet, the rod is cooled and granulated. Then the grafting step is carried out by post-baking the granules at a temperature allowing the grafting of the monomer having one or more alkoxy-silane groups.

Silane crosslinking is more advantageous than peroxide crosslinking because it makes it possible to obtain crosslinked homopolymeric polypropylenes with a higher molecular weight. The pipe thus obtained has high-temperature mechanical properties that are significantly improved compared to the crosslinking obtained with peroxide. Also, the silane pathway offers an easier method of implementation, in particular, as the crosslinking step c) does not require development of the particularly expensive extrusion line, such as a crosslinking oven.

Advantageously, the degree of crosslinking is greater than 50% and preferably greater than 75%, measured according to ASTM D2765-11.

Typically, when the underwater pipe is an underwater flexible pipe, the method comprises the following steps:
a) extrusion to form an inner polymeric sealing sheath comprising homopolymeric polypropylene as defined above, or the mixture of homopolymeric polypropylenes as defined above, wherein the extrusion is possibly carried out on a carcass,
b) assembling the inner polymeric sealing sheath obtained in step a) with at least one tensile armor ply (usually two armor plies).

If the extrusion of step a) is not carried out on a carcass, but independently, the resulting flexible pipe is smooth bore.

If the extrusion of step a) is carried out on a carcass, the resulting flexible pipe is rough bore.

When the flexible pipe comprises other layers, the method comprises step b) of assembling the inner polymeric sealing sheath obtained in step a) with the other layers to form the flexible underwater pipe, such as the pressure vault and/or the outer polymeric sealing sheath. The layers are thus assembled to form an unbonded flexible pipe as described in the normative documents published by the American Petroleum Institute (API), API 17J and API RP 17B.

Typically, when the underwater pipe is a rigid underwater pipe, the method comprises the following steps:
a) extrusion to form the inner polymeric sealing sheath comprising the homopolymeric polypropylene or homopolymeric polypropylene mixture,
b) assembly of the inner polymeric sealing sheath obtained in step a) with the metal tube.

According to a third object, the invention concerns an underwater pipe obtainable by the aforementioned method.

According to a fourth object, the invention concerns the use of the abovementioned underwater pipe for the transport of hydrocarbons.

According to a fifth object, the invention concerns the use of a homopolymeric polypropylene or a homopolymeric polypropylene mixture, wherein the homopolymeric polypropylene or the mixture has:
 a density (according to ISO 1183 revised in 2012) of more than 0.900 g/cm$^3$, and
 a melt index (according to ISO 1133 revised in 2011) measured at 230° C. under a mass of 2.16 kg of less than 10 g/10 minutes,
in an inner polymeric sealing sheath of an underwater pipe for the transport of hydrocarbons.

The embodiments described above are, of course, applicable.

Other features and advantages of the invention appear upon reading the description given below of particular embodiments of the invention, given for information but not limiting, with reference to FIGS. 1 and 2.

Due to the presence of the inner carcass 22, this pipe is said to be rough bore. The invention could also be applied to a so-called smooth-bore pipe, which does not include an inner carcass.

Likewise, the scope of the present invention is not exceeded by eliminating the pressure vault 18, insofar as the helix angles of the threads constituting the armor plies 12, 14 are close to 55° and in the opposite direction.

Figure 1:
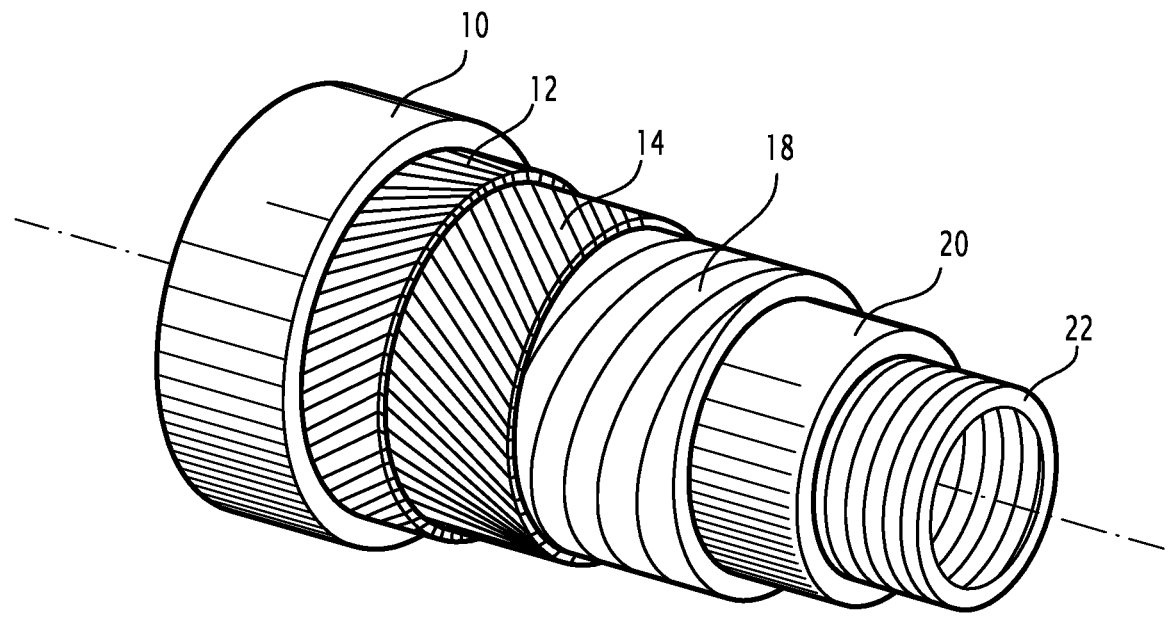
FIG. 1 shows a partial schematic perspective view of a flexible pipe according to the invention. It illustrates a pipe according to the invention comprising, from the outside to the inside:
 an outer polymeric sheath 10,
 an outer ply of tensile armor 12,
 an inner ply of tensile armor 14 wound in the opposite direction to the outer ply 12,
 a pressure vault 18 to take up the radial forces generated by the pressure of the hydrocarbons transported,
 an inner polymeric sheath 20, and
 an inner carcass 22 to take up radial crushing forces,
wherein the inner polymeric sealing sheath 20 comprises a homopolymeric polypropylene or a homopolymeric polypropylene mixture with a density and melt index as defined above.

The armor plies 12, 14 are obtained by long-pitch winding of a set of metal or composite material wires, generally of substantially rectangular section. The invention also applies if these wires have a section of circular or complex geometry, for example of the auto-stapled T type. FIG. 1 shows only two armor plies 12 and 14, but the pipe could also include one or more additional armor pairs. The armor ply 12 is said to be external because it is here the outermost, starting from the inside of the pipe, before reaching the outer sealing sheath 10.

The flexible pipe may also comprise layers not shown in FIG. 1, such as:
a holding layer between the outer polymeric sheath 10 and the tensile armor plies 12 and 14, or between two tensile armor plies,
one or more anti-wear layers of polymeric material in contact either with the inner face of the aforementioned holding layer, or with its outer face, or with both faces, wherein this anti-wear layer prevents the holding layer from wear through contact with metal armor. Anti-wear layers, which are well known to those skilled in the art, are generally made by helical winding of one or more ribbons obtained by extrusion of a polymeric material based on polyamide, polyolefins, or PVDF (polyvinylidene fluoride). Reference may also be made to the document WO 2006/120320 which describes anti-wear layers consisting of polysulfone (PSU), polyethersulfone (PES), polyphenylsulfone (PPSU), polyetherimide (PEI), polytetrafluoroethylene (PTFE), polyetheretherketone (PEEK) or phenylene polysulfide (PPS) ribbons.

Figure 2:
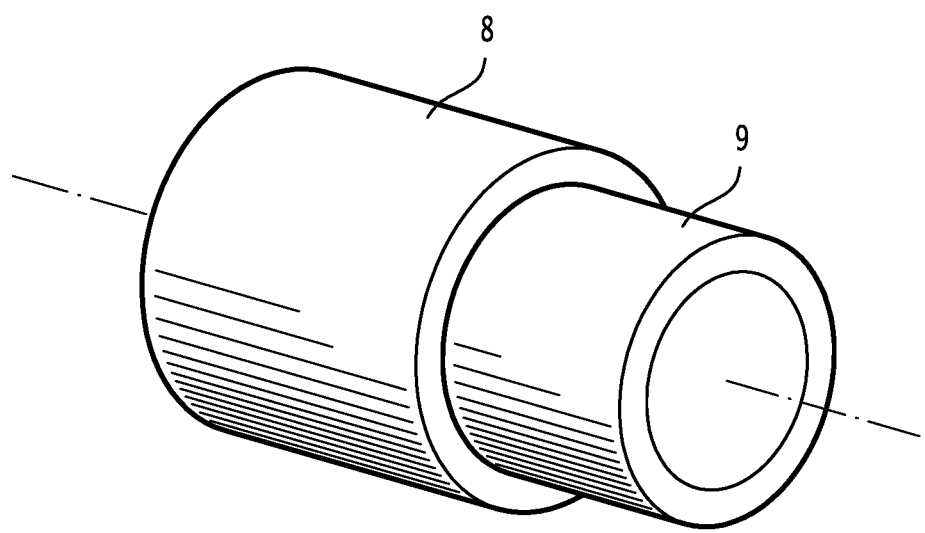

FIG. 2 shows a partial schematic perspective view of a rigid pipe according to the invention. It illustrates a pipe according to the invention comprising, from the outside to the inside:
a metal reinforcing layer 8,
an inner polymer polymeric sheath 9 comprising a homopolymeric polypropylene or a mixture of homopolymeric polypropylenes of density and melt index as defined above.

EXAMPLE

Example 1: Swelling Rate of Polypropylenes in the Presence of a Petroleum Fluid at Elevated Temperature Samples of different families of polypropylene were weighed and then contacted with a petroleum fluid: the Biofree EN 590 diesel, and then weighed after contact for a certain time in this fluid. The difference in mass before and after contacting makes it possible to determine the degree of swelling.

The swelling rate (mass percentage) of various families of polypropylene in the presence of a petroleum fluid: the Biofree EN 590 diesel, were compared and are provided in Table 1.

TABLE 1

Swelling rate of various polypropylenes in the presence of Biofree EN 590 diesel

| polypropylene | | fluid index according to ASTM D1238 (g/10 min) | density according to ISO 1183 revised in 2012 | swelling rate in presence of Biofree EN 590 diesel | | |
|---|---|---|---|---|---|---|
| | | | | at 110° C. after 6 h | at 110° C. after 188 h | at 120° C. after 115 h |
| syndiotactic homopolymer | FINAPLAST 1251 from Total | 2.0 | 0.88 | 31% | x | x |
| graft copolymer | PPR 3221 from Total | 1.8 | 0.902 | 110% | x | x |
| isotactic homopolymer | PPH3060 from Total | 1.8 | 0.905 | 13% | 21% | 24% |
| isotactic homopolymer | Beta (β)-PP ™ BE60-7032 from Borealis | 0.3 | 0.905 | 16% | 33% | 44% |
| metallocene static copolymer | Lumicene MR10MX0 from Total | 10 | 0.902 | 88% | x | x |
| isotactic homopolymer | Hostallen PPH 2250 36 from Lyondell basell | 0.3 | 0.915 | 14% | 25% | 39% |

These results show that the homopolymeric polypropylenes used in the sheath of the pipe according to the invention have a low swelling rate in the presence of hydrocarbons at high temperatures.

Example 2: Resistance of Polypropylenes Upon Violent Decompressions

Various families of polypropylene were placed in the presence of a petroleum fluid: consisting of 85% of $CH_4$ and 15% of $CO_2$ at 110° C. at 200 bar, and then the pressure was lowered to atmospheric pressure (1 bar) at a speed of 70 bar/min. The appearance of blisters on the surface of the polypropylenes after this treatment was monitored (Table 2).

TABLE 2 appearance of blisters on the surface of various
polypropylenes after violent decompressions

| polypropylene | | fluid index according to ASTM D1238 (g/10 min) | density according to ISO 1183 revised in 2012 | blistering |
|---|---|---|---|---|
| syndiotactic homopolymer | FINAPLAST 1251 from Total | 2 | 0.88 | yes |
| graft copolymer | PPR 3221 from Total | 1.8 | 0.902 | yes |
| isotactic homopolymer | PPH3060 from Total | 1.8 | 0.905 | no |
| isotactic homopolymer | Beta (β)-PP ™ BE60-7032 from Borealis | 0.3 | 0.905 | no |
| isotactic homopolymer | Hostallen PPH 2250 36 from Lyondell basell | 0.3 | 0.915 | no |

These results show that the homopolymeric polypropylene used in the pipe according to the invention are capable of withstanding violent decompressions simulating production shut-downs.

The invention claimed is:

1. An underwater flexible pipe for the transport of hydrocarbons comprising an arrangement that consists of a metal reinforcing layer that is directly contacting an inner polymeric sealing sheath, the metal reinforcing layer consisting of metallic tensile armor plies, each metallic tensile armor ply being defined by a helical winding of at least one metal wire and having a helical angle of less than 60°, wherein said pipe does not have an inner hydrocarbon-proof layer that prevents contact between said inner polymeric sealing sheath and hydrocarbons, wherein the inner polymeric sealing sheath consists of only one layer comprising a homopolymeric polypropylene or a mixture of homopolymeric polypropylenes, and wherein the homopolymeric polypropylene or the mixture has:
   a density greater than 0.900 g/cm³, and
   a melt index measured at 230° C. under a mass of 2.16 kg of less than 10 g/10 minutes,
   the inner polymeric sealing sheath being free of polyethylene.

2. The underwater pipe according to claim 1, wherein the homopolymeric polypropylene or the homopolymeric polypropylene mixture has:
   a density greater than 0.902 g/cm³, and/or
   a melt index measured at 230° C. under a mass of 2.16 kg of less than 5 g/10 min.

3. The underwater pipe according to claim 1, wherein the homopolymeric polypropylene or homopolymeric polypropylene mixture has a melting temperature of at least 145° C.

4. The underwater pipe according to claim 1, wherein the homopolymeric polypropylene has a degree of crystallinity of at least 40%, or the homopolymeric polypropylene mixture comprises at least one homopolymeric polypropylene having a degree of crystallinity of at least 40%.

5. The underwater pipe according to claim 1, wherein the homopolymeric polypropylene or the homopolymeric polypropylene mixture has a swelling rate of less than 30% by weight when it is brought into contact with Biofree EN 590 diesel at 110° C. for 6 hours.

6. The underwater pipe according to claim 1, wherein the homopolymeric polypropylene is an isotactic homopolymeric polypropylene, or the homopolymeric polypropylene mixture comprises at least one isotactic homopolymeric polypropylene.

7. The underwater pipe according to claim 6, wherein the isotactic homopolymeric polypropylene, or the at least one isotactic homopolymeric polypropylene of the homopolymeric polypropylene mixture, has an isotacticity rate of at least 93%.

8. The underwater pipe according to claim 6, wherein the isotactic homopolymeric polypropylene, or the at least one isotactic homopolymer of the homopolymeric polypropylene mixture, has a crystalline morphology more than 50% of the beta and/or alpha type.

9. The underwater pipe according to claim 1, wherein the weight ratio of homopolymeric polypropylene, or of the mixture of homopolymeric polypropylenes, in the inner polymeric sealing sheath is greater than 50% by weight relative to the inner polymeric sealing sheath.

10. The underwater pipe according to claim 1, wherein the homopolymeric polypropylene is crosslinked, or the homopolymeric polypropylene mixture comprises at least one crosslinked homopolymeric polypropylene.

11. A method for transporting hydrocarbons wherein the hydrocarbons are transported in the underwater pipe according to claim 1.

12. An underwater pipe for the transport of hydrocarbons comprising an arrangement that consists of an inner polymeric sealing sheath and a metal reinforcing layer consisting of a metal tube which is directly contacting the inner polymeric sealing sheath, wherein the pipe does not have an inner hydrocarbon-proof layer that prevents contact between the inner polymeric sealing sheath and hydrocarbons, wherein the underwater pipe is rigid, and the inner polymeric sealing sheath consists of only one layer comprising a homopolymeric polypropylene or a mixture of homopolymeric polypropylenes, and wherein the homopolymeric polypropylene or the mixture has:
   a density greater than 0.900 g/cm³, and
   a melt index measured at 230° C. under a mass of 2.16 kg of less than 10 g/10 minutes,
   the inner polymeric sealing sheath being free of polyethylene.

13. An underwater flexible pipe for the transport of hydrocarbons, comprising an arrangement, from the outside to the inside:
   tensile armor plies, each tensile armor ply comprising a helical winding of at least one metal wire and having a helical angle of less than 60°, the tensile armor plies being directly around a pressure vault consisting of longitudinal metal wire wound with a helical winding at a helix angle between 75° and 90° as a metal reinforcing layer;

an inner polymeric sealing sheath, the pressure vault directly contacting the inner polymeric sealing sheath; and a metal carcass, wherein the pipe does not have an inner hydrocarbon-proof layer that prevents contact between hydrocarbons and the inner polymeric sealing sheath, wherein the inner polymeric sealing sheath consists of only one layer comprising a homopolymeric polypropylene or a mixture of homopolymeric polypropylenes, and wherein the homopolymeric polypropylene or the mixture has:

a density greater than 0.900 g/cm$^3$, and a melt index measured at 230° C. under a mass of 2.16 kg of less than 10 g/10 minutes, the inner polymeric sealing sheath being free of polyethylene.

14. The underwater pipe according to claim 13, wherein the homopolymeric polypropylene or the homopolymeric polypropylene mixture has:

a density greater than 0.902 g/cm$^3$, and/or a melt index measured at 230° C. under a mass of 2.16 kg of less than 5 g/10 min.

15. The underwater pipe according to claim 13, wherein the homopolymeric polypropylene or homopolymeric polypropylene mixture has a melting temperature of at least 145° C.

16. The underwater pipe according to claim 13, wherein the homopolymeric polypropylene has a degree of crystallinity of at least 40%, or the homopolymeric polypropylene mixture comprises at least one homopolymeric polypropylene having a degree of crystallinity of at least 40%.

17. The underwater pipe according to claim 13, wherein the homopolymeric polypropylene or the homopolymeric polypropylene mixture has a swelling rate of less than 30% by weight when it is brought into contact with Biofree EN 590 diesel at 110° C. for 6 hours.

18. The underwater pipe according to claim 13, wherein the homopolymeric polypropylene is an isotactic homopolymeric polypropylene, or the homopolymeric polypropylene mixture that comprises at least one isotactic homopolymeric polypropylene.

19. The underwater pipe according to claim 18, wherein the isotactic homopolymeric polypropylene, or the at least one isotactic homopolymeric polypropylene of the homopolymeric polypropylene mixture, has an isotacticity rate of at least 93%.

* * * * *